June 8, 1926.
L. F. MORRISON
1,587,546
SEED GATHERING ATTACHMENT FOR MOWING MACHINES
Filed Feb. 18, 1925      2 Sheets-Sheet 1
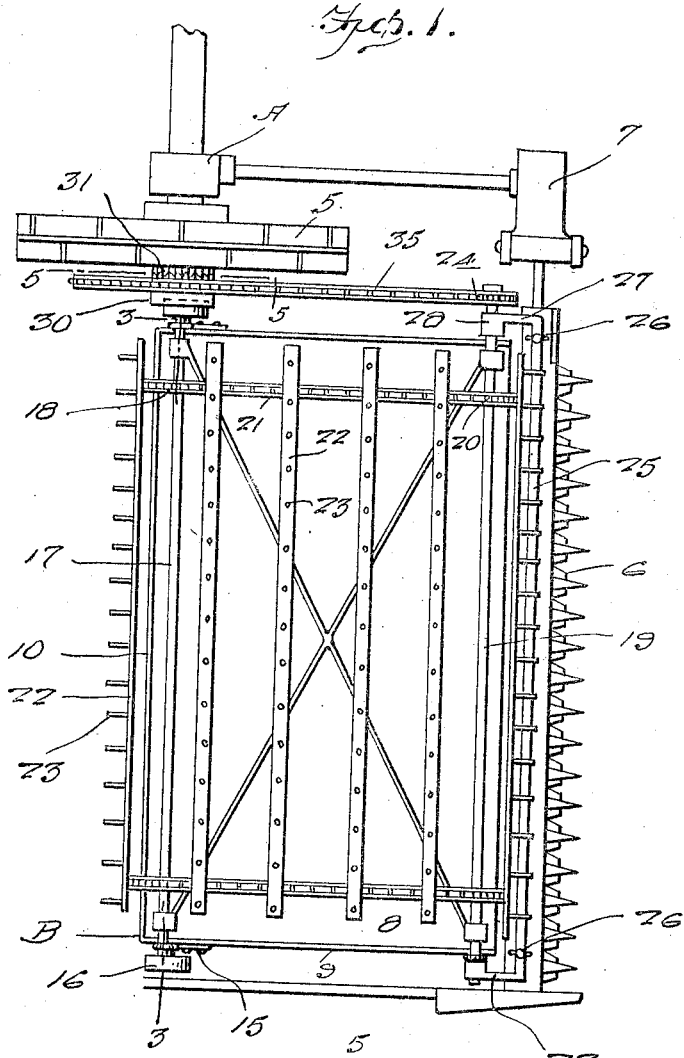
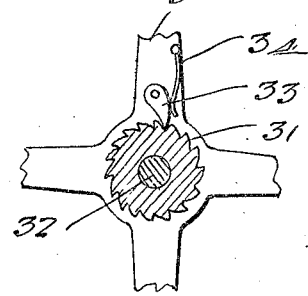
Inventor
L. F. Morrison
By
Clarence A. O'Brien
Attorney June 8, 1926.
L. F. MORRISON
1,587,546
SEED GATHERING ATTACHMENT FOR MOWING MACHINES
Filed Feb. 18, 1925        2 Sheets-Sheet 2
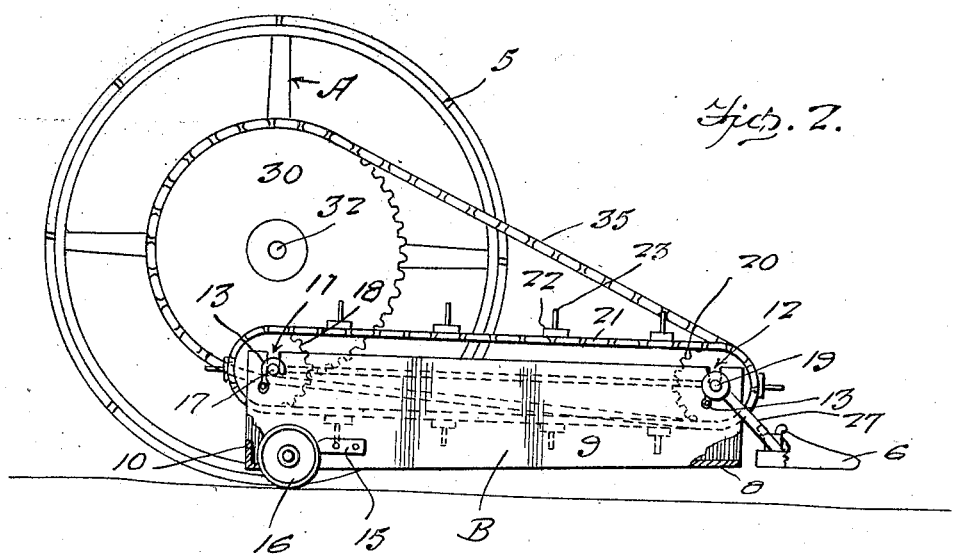
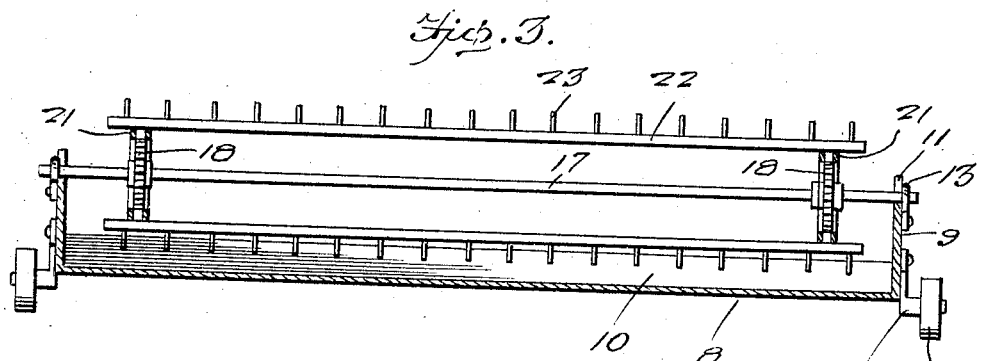
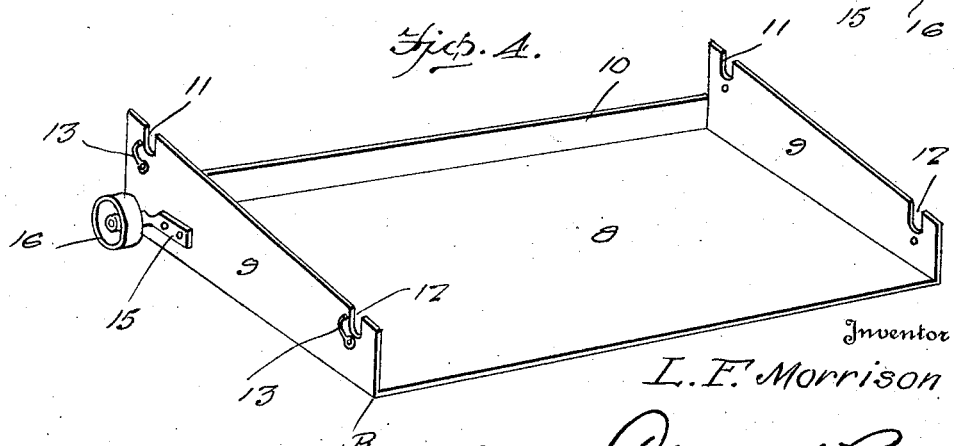
Inventor
L. F. Morrison Patented June 8, 1926.

1,587,546

UNITED STATES PATENT OFFICE.

LUTHER F. MORRISON, OF COMO, MISSISSIPPI.

SEED-GATHERING ATTACHMENT FOR MOWING MACHINES.

Application filed February 18, 1925. Serial No. 10,028.

The present invention relates to an attachment for mowing machines and has for its principal object to provide a structure which will be efficient in gathering the seeds from the hay or the like after the same has been cut by the mowing machine.

Another important object of the invention is to provide an attachment of this nature which will be located to the rear of the cutting mechanism of the mowing machine and gather the hay and pass the same over a seed collecting pan and deliver the hay to the rear thereof on the ground.

Another important object of the invention is to provide an attachment with seed gathering features and a conveyor operable by the traveling wheel adjacent thereto of the mowing machine.

A still further object of the invention is to provide an attachment of this nature having a comparatively simple structure which is thoroughly reliable in operation, strong, durable and not liable to readily get out of order, easily assembled and disassembled and well adapted to the purpose for which it is designed.

With the above and numerous other objects in view as will appear as the description proceeds, the invention relies in certain novel features of construction, and in the combination and arrangement of parts as will be hereinafter more fully described and claimed.

In the drawings:—

Figure 1 is a top plan view of the attachment showing portions of a mowing machine associated therewith.

Figure 2 is a side elevation thereof.

Figure 3 is a transverse vertical section therethrough, taken substantially on the line 3—3 of Figure 1 looking in the direction of the arrow, Figure 4 is a detail perspective view of the seed pan, and Figure 5 is a detail section taken substantially on the line 5—5 of Figure 1 looking in the direction of the arrow.

Referring to the drawing in detail it will be seen that A designates generally portions of a mowing machine which among other elements includes the pull wheel 5, cutter 6, and the means for operation of the cutter which is indicated by the numeral 7. My improved seed pan is indicated generally at B and includes the bottom 8 and upstanding sides 9 between which is disposed the rear wall 10 at the rear edge of the bottom 8. The height of the wall 10 is less than that of the sides 9 and it is to also be noted that the upper edges of the sides 9 slant upwardly and rearwardly and are provided with notches 11 and 12 adjacent their ends. A pivoted hook 13 is associated with each notch 11, 12, for a purpose which will be recited later in the description. At the rear outer surfaces of the sides 9 there are mounted brackets 15 for rotatably carrying the rollers or wheels 16 which support the rear end of the seed pan. A shaft 17 is mounted to extend through the notches 11 and is detachably held therein by the adjacent pivoted hooks 13. A pair of sprockets 18 are mounted on this shaft 17. A shaft 19 is extended through and journaled in the notches 12 and has keyed thereon sprockets 20 aligned with the sprockets 18 in order that chains 21 may be trained thereover. Cross bars 22 are mounted in spaced relation to each other on these chains 21 and are provided with prongs 23. The chains 21, bars 22, and prongs 23 form a conveyor. A sprocket 24 is mounted on the end of the shaft 19 beyond the sides 9 and adjacent the mowing machine as is more clearly illustrated in Figure 1. A bar 25 is attached to the cutters 6 by suitable fastening elements as at 26 and has at its ends angularly disposed arms 27 terminating in sleeve 28 which receives the shaft 19 so as to support this shaft on the cutter. The hook catches 13 adjacent the notches 11 are engaged over the shaft 19 whereby the forward end of the seed pan is supported by the cutter 6 of the mowing machine.

The axle of the mowing machine A on which is journaled the bull wheel 5 is extended beyond the bull wheel and has rotatably mounted thereon a sprocket 30 having a ratchet segment 31 formed thereon which is eccentrically disposed about the extension 32 of said axle and engageable by a pawl 33 pivoted on a spoke of the bull wheel 5 and pressed into normal engagement with the ratchet by a suitable spring 34 so that when the bull wheel is rotating in a forward direction the sprocket 30 will be rotated therewith whereas when the wheel is rotated backwardly the dog will slip over the ratchet and the sprocket 30 will remain stationary. It will also be seen that the dog 30 may be entirely disengaged from the ratchet 31 by swinging the same as illustrated in Figure 5 in a counter clockwise direction until the spring tends to hold the same out of engagement with the ratchet 31. This pawl 33 and ratchet 31, therefore, function as a clutch. A chain 35 is trained over the sprockets 24 and 30, it being understood that the sprocket 30 is larger than the sprocket 24, although of course, this is not necessary.

When the device is assembled the bottom of the pan is inclined downwardly and rearwardly as is indicated in Figure 2, while the upper edges of the sides 9 are substantially level. When the mowing machine progresses forwardly the bull wheel 5 rotates the sprocket 30 as previously indicated thereby operating the chain 35 which in turn rotates the sprockets 20 through the intermediacy of sprocket 24 and shaft 19. The rotation of these sprockets 20 cause the conveyor to travel in the same direction with the rotation of the bull wheel 5 so that the cross bars 21 are traveling adjacent the bottom 8 from the forward edge to the rear edge, and of course, at the same time the cutter fixes in operation by the conventional mechanism of the mowing machine. It will thus be seen that the hay will drop over toward the seed pan and the conveyor and be pulled along the bottom thereof and finally delivered to the rear of the seed pan. During this traveling of the hay over the bottom 8 the seeds will be shaken therefrom and will settle on the bottom collecting adjacent the rear wall 10 because of the incline of the bottom 8. There is no need of more than one man for operation of this attachment and mower, and when sufficient seeds have been collected on the bottom 8 adjacent the rear wall 10 the mowing machine may be stopped and the operator thereof may disengage shaft 17 from the sides 9 so that ready access may be had to the pan and remove the seeds placing them in suitable receptacles such as bags or the like.

It will be apparent from the above that I have devised a very simple and efficient attachment of this nature wherein the parts thereof may be quickly, easily and readily assembled and disassembled and that the device when assembled is thoroughly reliable in operation, strong, durable and well adapted to the purpose for which it is designed. It will further be apparent that the present embodiment of the invention which I have described in detail by way of example attains all the features of the invention as recited in the statement of the invention and the above description, and that numerous changes in the details of construction, and in the combination and arrangement of parts may be resorted to without departing from the spirit or scope of the invention as hereinafter claimed or sacrificing any of its advantages.

Having thus described the invention, what I claim is:—

1. An attachment for mowing machines including a seed pan having an open top and comprising an inclined bottom, sides having horizontally disposed upper edges, and a rear wall of less height than the sides, said sides provided on their upper edges with spaced notches, shafts extending between the sides and disposed in said notches, means for holding the shaft in said notches, and a conveyor trained about and operable by said shaft.

2. An attachment for mowing machines including a seed pan having an open top and comprising an inclined bottom, sides having horizontal upper edges, and a rear wall of less height than the sides, provided with notches on said upper edges, a pair of shafts extending across the seed pan and disposed in said notches, means for detachably holding the shafts in said notches, sprockets on said shafts, chains trained over said sprockets, cross bars on said chains, and prongs extending from said cross bars to be movable over the inclined bottom.

In testimony whereof I affix my signature.

L. F. MORRISON.